No. 624,578. Patented May 9, 1899.
T. TOOMEY.
REIN OPERATING DEVICE.
(Application filed July 30, 1898.)
(No Model.)
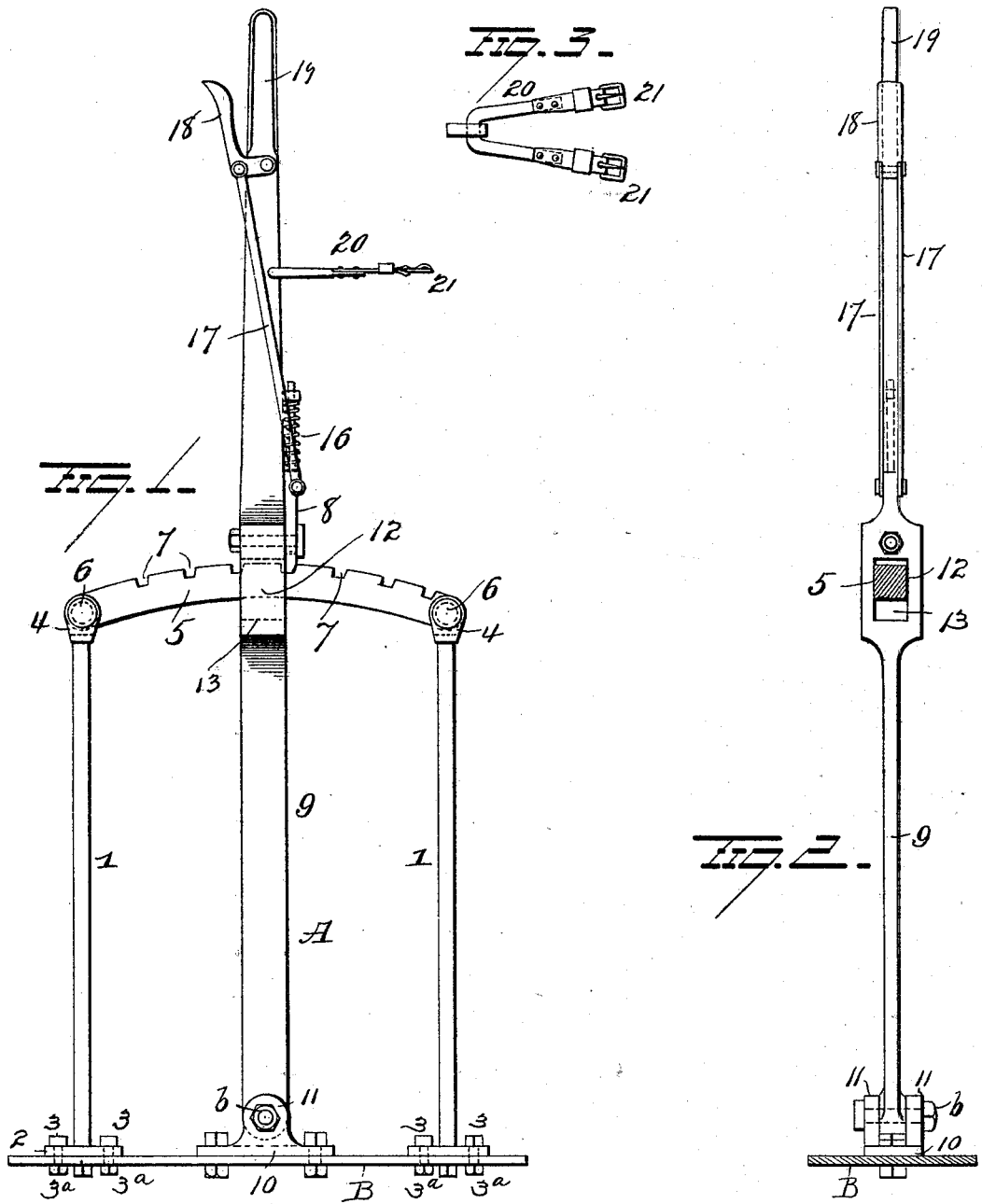

UNITED STATES PATENT OFFICE.

THOMAS TOOMEY, OF SCRANTON, PENNSYLVANIA.

REIN-OPERATING DEVICE.

SPECIFICATION forming part of Letters Patent No. 624,578, dated May 9, 1899.

Application filed July 30, 1898. Serial No. 687,297. (No model.)

*To all whom it may concern:*

Be it known that I, THOMAS TOOMEY, of Scranton, in the county of Lackawanna and State of Pennsylvania, have invented certain new and useful Improvements in Rein-Operating Devices; and I do hereby declare the following to be a full, clear, and exact description of the invention, such as will enable others skilled in the art to which it appertains to make and use the same.

My invention relates to an improvement in rein-operating devices, and more particularly to a device for assisting a driver in controlling unruly horses, the object of the invention being to so provide a device that when a pair of reins are attached thereto an operator can without difficulty operate the device by simply throwing a lever, and thus throw a great amount of force into the backward pull of the reins, and hence stop the horses.

A further object is to provide a device that will be simple in construction, neat in appearance, and very effectual when in operation.

With these objects in view the invention consists in certain novel features of construction and combinations and arrangements of parts, as will be more fully hereinafter described, and pointed out in the claims.

In the accompanying drawings, Figure 1 is a side view. Fig. 2 is a view partly in section, and Fig. 3 is a detail.

A represents my rein-operating device, and B a portion of a vehicle to which same is secured. The rein-operator A is provided with a frame comprising two uprights 1 1, provided at their lower ends with extended bearings 2 2, in which holes are provided in alinement with holes in the vehicle through which bolts 3 are adapted to pass and be secured in place by nuts 3ª and lock the supports securely on the vehicle. The standards are provided with enlarged bifurcated upper ends 4 4, adapted to receive between them a notched bar 5, which is secured in said bifurcated ends by means of bolts 6 or other approved means. The bar 5 is provided at intervals along its upper edge with notches 7, adapted to receive a dog or latch 8, connected with the operating-lever 9, which will now be described.

The operating-lever 9 is pivoted to a support 10, secured to the vehicle at a point between the standards 1 1, and said standard is provided with a bifurcated upper portion 11, provided with holes in alinement with a hole in the end of the lever through which a bolt *b* is adapted to pass and secure the lower end of the lever in said bifurcated portion and allow the lever pivotal connection therewith. The lever 9 is provided between its ends with an enlarged portion 12, having a slot or hole 13 to receive the notched bar 5 and permit the adjustment of the lever. The dog or latch 8 is movably connected to said lever 9 and adapted to engage the notches on the bar 5 and securely lock the lever in position. A spring 16 is connected to said lever and is adapted to normally press the dog or latch into one of the notches on the bar 5. One or more rods 17 connect said dog or latch with a finger-bar 18, pivoted to a handle 19 on the upper end of the lever 9. A rein-holder 20, made of a single piece of metal and secured to the lever or arm by any approved means at a point preferably near its upper end, is bent between its ends to form two arms and provided at the end of each arm with a buckle 21, adapted to secure the ends of the reins.

It will be understood from the above description that when the reins are secured to the buckles 21 and the horses become unruly it is simply necessary to operate the finger-bar, release the dog or latch, and pull the lever backward far enough to exert sufficient pull on the reins to stop the horses, when the latch or dog can be released and let fall into one of the notches and securely hold the lever in that position until the horses come to a full stop, when the latch or dog can be released and the lever placed in its original position.

Various slight changes might be made in the general form and arrangements of the several parts described without departing from the spirit and scope thereof, and hence I would have it understood that I do not wish to limit myself to the precise details set forth, but consider myself at liberty to make such slight changes and alterations as fairly fall within the spirit and scope of my invention.

Having fully described my invention, what I claim as new, and desire to secure by Letters Patent, is—

1. In a rein-operating device, the combination with a base-plate, of two standards secured thereto, a notched bar secured to and connecting the upper ends of said standards, a lever pivoted to the base-plate between said standards and a latch carried by the lever and adapted to engage said notched bar, substantially as set forth.

2. In a rein-operating device, the combination with a pivoted lever having an opening between its ends, of a fixed notched bar passing through the opening in the lever, a latch carried by the lever and adapted to engage said notched bar and means for attaching reins to said lever, substantially as set forth.

3. In a rein-operating device, the combination of a fixed notched bar, a pivoted lever, a latch carried by the pivoted lever and adapted to engage said notched bar, and a strap permanently secured to said lever and having buckles at its free ends for the attachment thereto of reins, substantially as set forth.

In testimony whereof I have signed this specification in the presence of two subscribing witnesses.

THOMAS TOOMEY.

Witnesses:
A. W. MUSGRAVE,
EDGAR HOWELLS.